United States Patent
Lee (10) Patent No.: US 8,781,050 B2
(45) Date of Patent: Jul. 15, 2014

(54) METHOD AND APPARATUS FOR ESTIMATING SYMBOL TIMING

(75) Inventor: Jae-Ho Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 779 days.

(21) Appl. No.: 12/878,549

(22) Filed: Sep. 9, 2010

(65) Prior Publication Data

US 2011/0150157 A1    Jun. 23, 2011

(30) Foreign Application Priority Data

Dec. 17, 2009  (KR) .................. 10-2009-0126215
Feb. 4, 2010   (KR) .................. 10-2010-0010250

(51) Int. Cl.
*H04L 7/00* (2006.01)
*H04L 7/04* (2006.01)

(52) U.S. Cl.
CPC ............. *H04L 7/042* (2013.01); *H04L 7/007* (2013.01)
USPC ............ 375/355; 375/316; 375/324; 375/340

(58) Field of Classification Search
USPC .................. 375/316, 355, 324, 340
See application file for complete search history.

(56) References Cited

U.S. PATENT DOCUMENTS

| | | | |
|---|---|---|---|
| 8,325,704 B1* | 12/2012 | Lemkin et al. ............... | 370/350 |
| 2001/0031021 A1* | 10/2001 | Fujimura et al. ............. | 375/324 |
| 2006/0050775 A1* | 3/2006 | Li et al. ..................... | 375/150 |
| 2011/0026423 A1* | 2/2011 | Quigley et al. ............. | 370/252 |

FOREIGN PATENT DOCUMENTS

| | | |
|---|---|---|
| KR | 1020070014168 | 1/2007 |
| KR | 10-0998415 | 12/2010 |

* cited by examiner

*Primary Examiner* — Ted Wang
(74) *Attorney, Agent, or Firm* — Nelson Mullins Riley & Scarborough LLP; Anthony A. Laurentano, Esq.; Dipti Ramnarain, Esq.

(57) ABSTRACT

Provided is a symbol timing estimating apparatus and method that may generate at least one sampled preamble signal by sampling a preamble signal with changing a phase of the preamble signal based on a symbol speed, calculate a power value of each of the at least one sampled preamble signal, and estimate a symbol timing of a sampled preamble signal having a maximum power value by comparing each power value among the at least one sampled preamble signal.

14 Claims, 6 Drawing Sheets

METHOD AND APPARATUS FOR ESTIMATING SYMBOL TIMING

CROSS-REFERENCE TO RELATED APPLICATIONS

This application claims the benefit of Korean Patent Application No. 10-2009-0126215, filed on Dec. 17, 2009, and Korean Patent Application No. 10-2010-0010250, filed on Feb. 4, 2010, in the Korean Intellectual Property Office, the disclosures of which are incorporated herein by reference.

BACKGROUND

1. Field of the Invention

Embodiments of the present invention relate to a method and apparatus for estimating a symbol timing.

2. Description of the Related Art

To transmit data based on a frame unit in a wireless communication system, a transmission end may initially transmit a signal of a known form to a reception end. The signal of the known form is generally referred to as a preamble signal or a training signal. In the above transmission section, a determination with respect to the existence of a valid received signal, an automatic control of gain, an estimation and compensation of an initial carrier frequency error, a symbol timing detection of detecting a start point of an actual user data portion, and the like may be performed.

An existing scheme of detecting symbol timing may include a scheme of selecting, using a demodulation unit of providing a demodulated signal having a plurality of signal samples for each symbol period, one signal sample from the plurality of signal samples based on a correlation among the plurality of signal samples.

The above scheme needs a number of correlation obtaining apparatuses corresponding to a number of the signal samples when calculating the correlation using the plurality of signal samples. The above scheme corresponds to a symbol timing detection scheme having a feedback structure where the demodulator operates with respect to the plurality of signal samples and subsequently estimates a symbol timing using the correlation, and information associated with the estimated symbol timing is fed back to another demodulator positioned in a front end.

The above scheme uses a plurality of correlation obtaining apparatuses and uses a feedback structure of controlling a demodulator from a correlation. Accordingly, a performance of the demodulator may be deteriorated.

SUMMARY

According to an aspect of the present invention, there is provided an apparatus for estimating a symbol timing, including: a sampling unit to generate at least one sampled preamble signal by sampling a preamble signal with changing a phase of the preamble signal based on a symbol speed; a calculator to calculate a power value of each of the at least one sampled preamble signal; and a symbol estimator to estimate a symbol timing of a sampled preamble signal having a maximum power value by comparing each power value among the at least one sampled preamble signal.

According to another aspect of the present invention, there is provided an apparatus for estimating a symbol timing, including: a modulation unit to oversample a preamble signal and thereby output the oversampled preamble signal via a matching filter of the modulation unit; and a demodulation unit to receive the oversampled preamble signal via a matching filter of the demodulation unit, to generate at least one downsampled preamble signal by downsampling the oversampled preamble signal with changing a phase of the oversampled preamble signal based on a symbol speed, and to estimate a symbol timing of a downsampled preamble signal having a maximum power value by comparing each power value among the at least one downsampled preamble signal.

According to still another aspect of the present invention, there is provided a method of estimating a symbol timing, the method including: generating at least one sampled preamble signal by sampling a preamble signal with changing a phase of the preamble signal based on a symbol speed; calculating a power value of each of the at least one sampled preamble signal; and estimating a symbol timing of a sampled preamble signal having a maximum power value by comparing each power value among the at least one sampled preamble signal.

According to yet another aspect of the present invention, there is provided a method of estimating a symbol timing, including: receiving an oversampled preamble signal, which is output via a matching filter of a modulation unit, via a matching filter of the demodulation unit; generating, using the demodulation unit, at least one downsampled preamble signal by downsampling the oversampled preamble signal with changing a phase of the oversampled preamble signal based on a symbol speed; and estimating, using the demodulation unit, a symbol timing of a downsampled preamble signal having a maximum power value by comparing each power value among the at least one downsampled preamble signal.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

When it is determined detailed description related to a related known function or configuration they may make the purpose of the present invention unnecessarily ambiguous in describing the present invention, the detailed description will be omitted here. Also, terms used herein are defined to appropriately describe the exemplary embodiments of the present invention and thus may be changed depending on a user, the intent of an operator, or a custom. Accordingly, the terms must be defined based on the following overall description of this specification.

A symbol timing estimation apparatus according to an embodiment of the present invention may oversample a preamble signal that is input into a demodulation unit of an uplink cable modem, more quickly than a symbol speed, and may downsample the preamble signal passing through a matching filter with changing a phase of the preamble signal based on the symbol speed.

The symbol timing estimation apparatus may estimate an accurate symbol timing by calculating power values of downsampled preamble signals, comparing the calculated power values, and thereby finding a maximum power value.

The symbol timing estimation apparatus may correspond to the demodulation unit of the uplink cable modem. The preamble signal may correspond to a signal received via a demodulator of the uplink cable modem.

Hereinafter, a method of estimating a symbol timing using a symbol timing estimation apparatus according to an embodiment of the present invention will be described with reference to FIG. 1 and FIG. 2.

Figure 1:
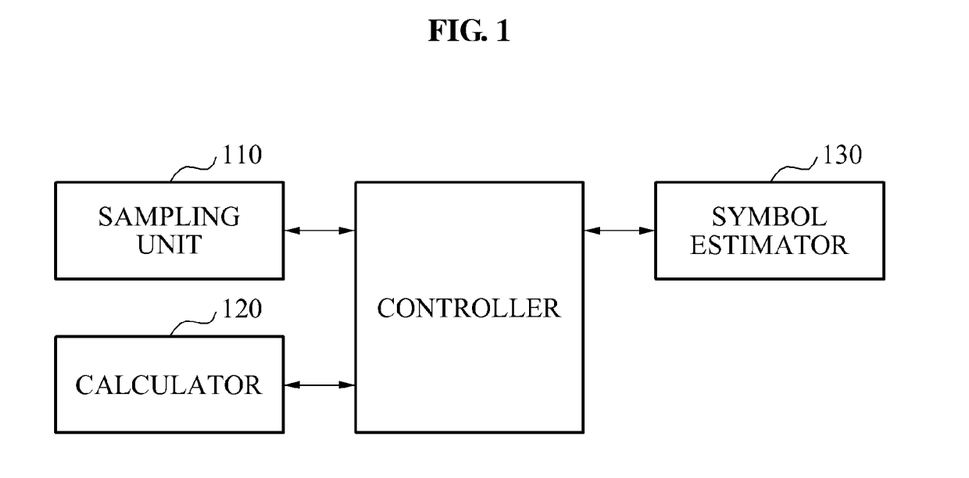
FIG. 1 is a block diagram illustrating a configuration of a symbol timing estimation apparatus according to an embodiment of the present invention.
Figure 2:
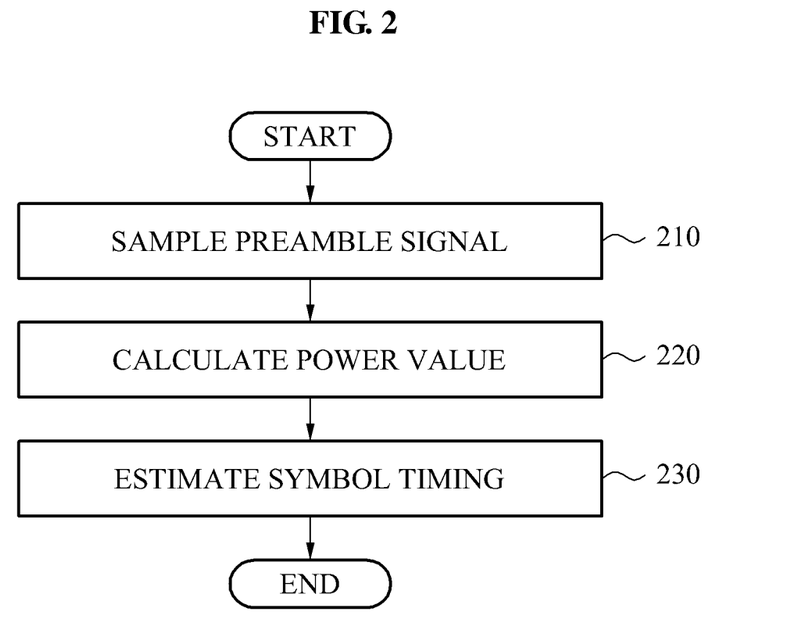
FIG. 2 is a flowchart illustrating a method of estimating a symbol timing according to an embodiment of the present invention.

FIG. 1 is a block diagram illustrating a configuration of a symbol timing estimation apparatus according to an embodiment of the present invention, and FIG. 2 is a flowchart illustrating a method of estimating a symbol timing according to an embodiment of the present invention.

As shown in FIG. 1, the symbol timing estimation apparatus may include a sampling unit 110, a calculator 120, and a symbol estimator 130.

In operation 210, the sampling unit 110 of the symbol timing estimation apparatus may generate at least one sampled preamble signal by sampling a preamble signal with changing a phase of the preamble signal based on a symbol speed.

The preamble signal received by the symbol timing estimation apparatus corresponds to a signal that is oversampled based on the symbol speed and thereby is generated as an oversampled preamble signal.

For example, when only a configuration of the demodulation unit of the uplink cable modem is assumed herein as the symbol timing estimation apparatus, the preamble signal may be oversampled more quickly than the symbol speed by the demodulation unit and thereby be input into the sampling unit 110. The sampling unit 110 may classify the preamble signal into at least one symbol by downsampling the oversampled preamble signal with changing a phase of the oversampled preamble signal.

Specifically, the sampling unit 110 may generate at least one downsampled preamble signal by downsampling the oversampled preamble signal with changing a phase of a matching filter output of the oversampled preamble signal based on the symbol speed.

The preamble signal may be configured by repeatedly using at least one sequence.

For example, when the symbol timing estimation apparatus uses a Constant Amplitude Zero Auto Correlation (CAZAC) sequence as the preamble signal, the preamble signal may be configured as the CAZAC sequence having a complex number value. A symbol length may include 16 samples as shown by the following Equation 1.

REAL(CAZAC)=(1,1,1,1,1,−1,−1,1,1,−1,1,−1,1,1,−1,−1)

IMAG(CAZAC)=(1,1,1,1,1,−1,−1,1,1,1,−1,1,−1,−1,1,1,−1,−1) [Equation 1]

Figure 3:
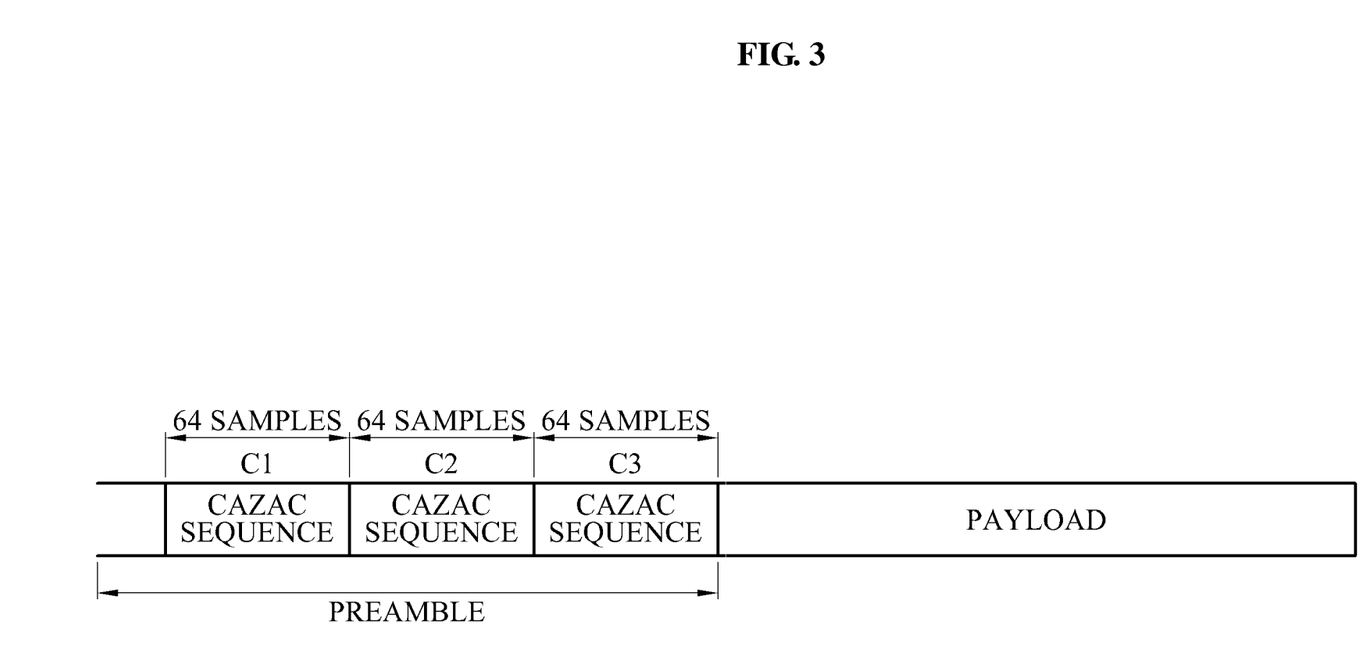
FIG. 3 is a diagram illustrating an example of a packet format according to an embodiment of the present invention.

FIG. 3 is a diagram illustrating an example of a packet format according to an embodiment of the present invention.

When it is assumed that a preamble signal is oversampled at a speed corresponding to four times of a symbol speed, the CAZAC sequence may include 64 samples (=16×4).

In operation 220, the calculator 120 may calculate a power value of each of the at least one sampled preamble signal.

In this instance, the calculator 120 may classify, using a phase path controller (not shown), the at least one power value into at least one symbol by calculating the at least one power value based on a sampling value of each of the at least one downsampled preamble signal.

In operation 230, the symbol estimator 130 may estimate a symbol timing of a sampled preamble signal having a maximum power value by comparing each power value among the at least one sampled preamble signal.

Figure 4:
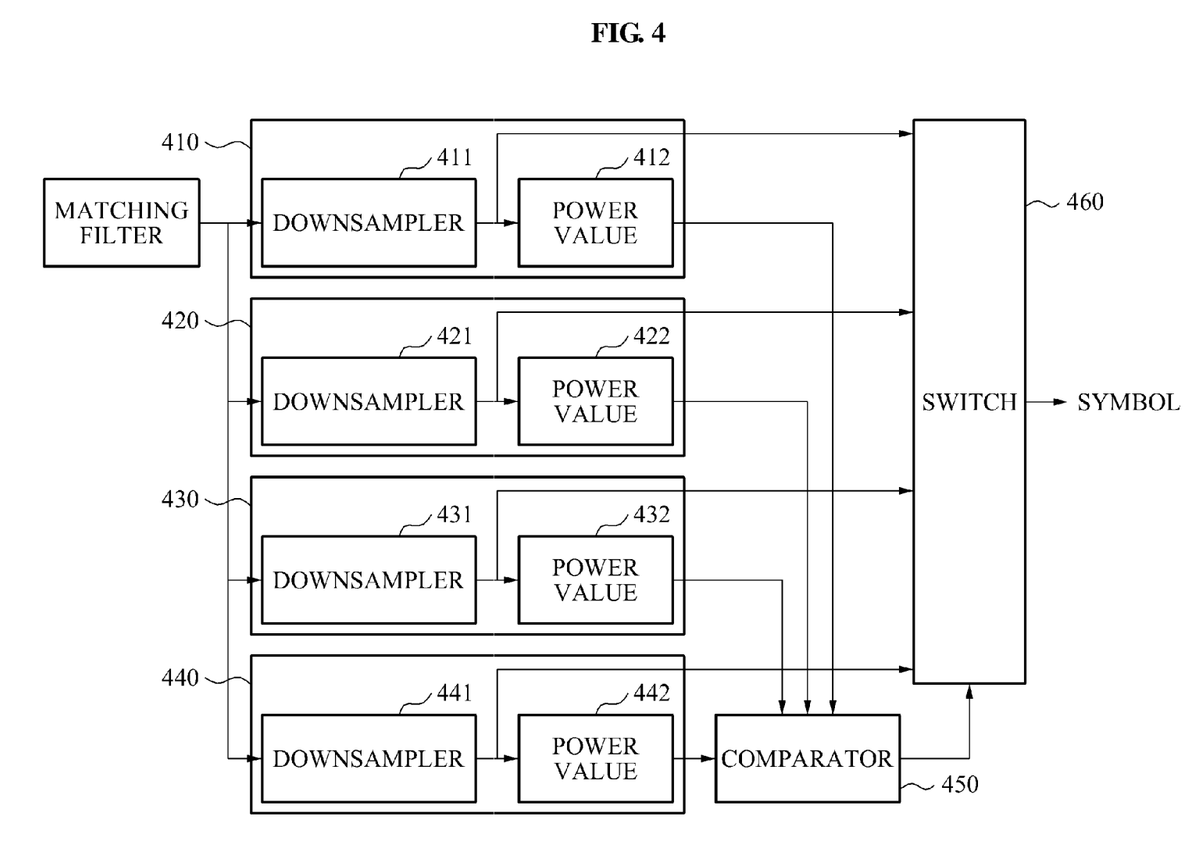
FIG. 4 is a block diagram illustrating a configuration of a symbol estimator according to an embodiment of the present invention.

FIG. 4 is a block diagram illustrating a configuration of a symbol estimator according to an embodiment of the present invention.

Referring to FIG. 4, the symbol estimator 130 may include a comparator 450 and a switch 460.

The comparator 450 may estimate location information associated with a symbol corresponding to a largest power value by comparing symbols.

For example, when it is assumed that symbols 410, 420, 430, and 440 that are phase paths classified by the calculator 120 include downsamplers 411, 421, 431, and 441, and power values 412, 422, 432, and 442, respectively, the downsampler 411 may use a first sample value among four sample values and the downsampler 421 may use a second sample value among the four sample values. For example, when it is assumed that outputs of a matching filter are 1, 2, 3, 4, 5, 6, 7, 8, . . . , outputs of the downsampler 411 may be 1, 5, . . . and outputs of the downsampler 421 may be 2, 6, . . . .

According to an embodiment of the present invention, a power value may be calculated according to the following Equation 2.

$$\text{Power value} = \sum_{k=0}^{15} (a^2 + b^2)/16, \qquad \text{[Equation 2]}$$

where a and b denote outputs of the downsamplers 411, 421, 431, and 441, and k denotes a number of symbols.

The switch 460 may output, as a symbol corresponding to a largest power value, a sampling value corresponding to the largest power value among at least one sampling value of at least one downsampled preamble signal, based on a location information that is received from the comparator 450.

For example, when the power value 412 of the phase path, that is, the symbol 410 is largest among four power values 412, 422, 432, and 442, the comparator 450 may transfer, to the switch 460, location information associated with the phase path, that is, the symbol 410. The switch 460 may output, as the symbol corresponding to the largest power value, only a single sample among four downsamplers 411, 421, 431, and 441, based on the location information transferred from the comparator 450.

Hereinafter, a symbol timing estimation apparatus including both a modulation unit and a demodulation unit according to another embodiment of the present invention will be described with reference to FIG. 5 and FIG. 6.

Figure 5:
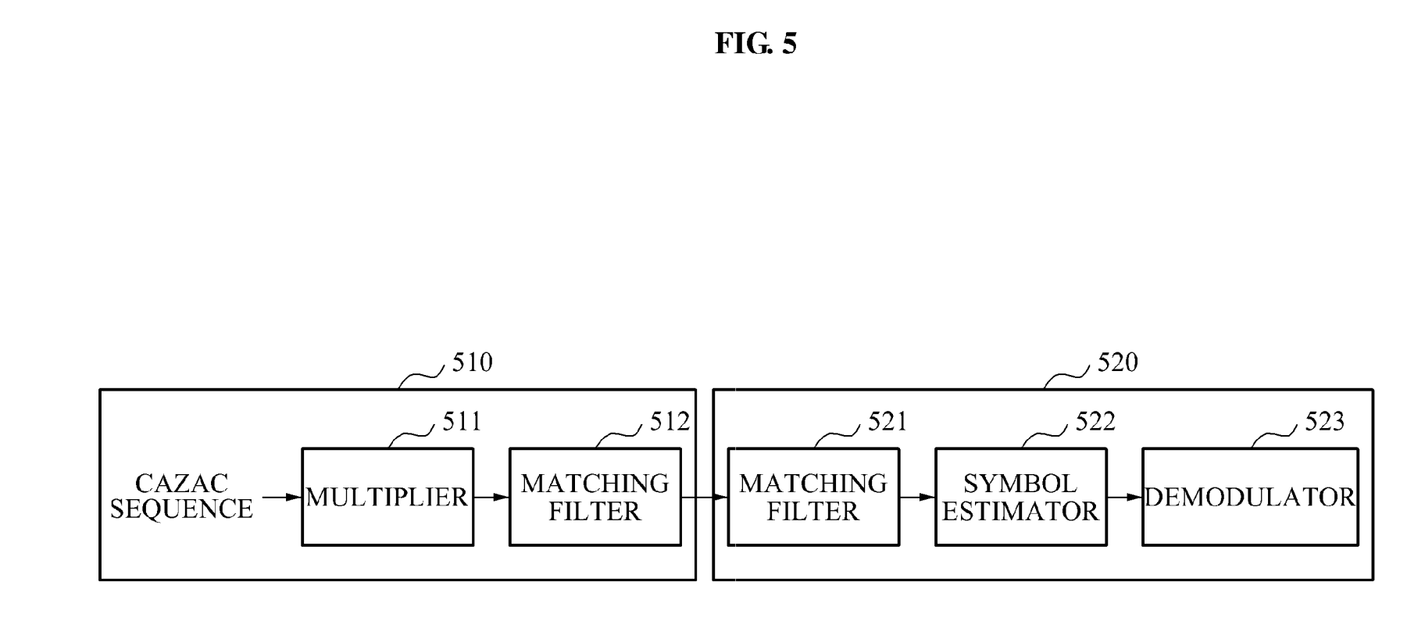
FIG. 5 is a block diagram illustrating a configuration of a symbol timing estimation apparatus according to another embodiment of the present invention.
Figure 6:
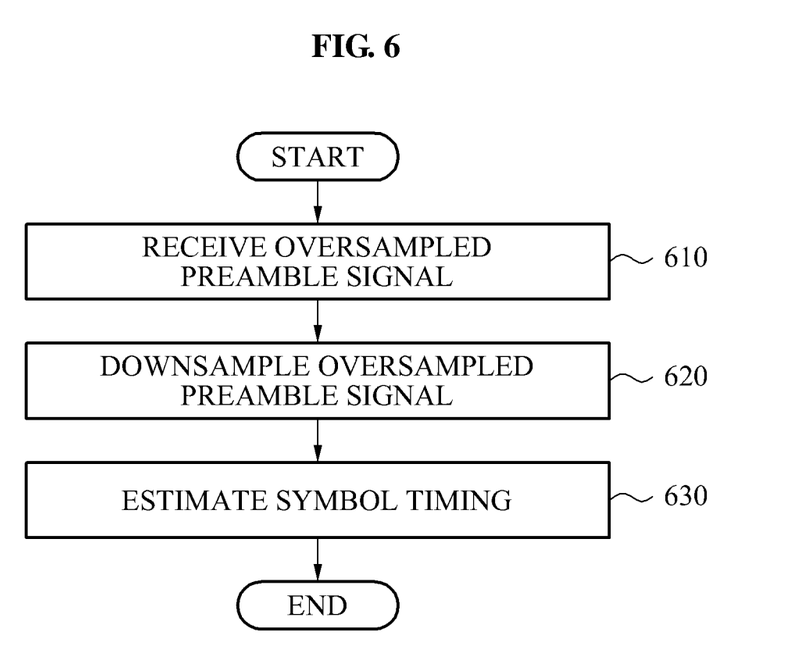
FIG. 6 is a flowchart illustrating a method of estimating a symbol timing according to another embodiment of the present invention.

FIG. 5 is a block diagram illustrating a configuration of a symbol timing estimation apparatus according to another embodiment of the present invention, and FIG. 6 is a flowchart illustrating a method of estimating a symbol timing according to another embodiment of the present invention.

Referring to FIG. 5, the symbol timing estimation apparatus may include a modulation unit 510 and a demodulation unit 520.

The modulation unit 510 may perform an oversampling process such as a process of multiplying 1/sqrt and a CAZAC sequence that is a preamble signal, using a multiplier 511, and then may output the oversampled preamble signal to the demodulation unit 520 via a matching filter 512.

In operation 610, the demodulation unit 520 may receive an oversampled preamble signal via a matching filter 521. In operations 620 and 630, using a symbol estimator 522, the demodulation unit 520 may generate at least one downsampled preamble signal by downsampling the oversampled preamble signal into with changing a phase of the oversampled preamble signal based on a symbol speed, and may estimate a symbol timing of a downsampled preamble signal having a maximum power value by comparing each power value among the at least one downsampled preamble signal and output the estimated symbol timing to a demodulator 523.

According to embodiments of the present invention, a demodulator of an uplink cable modem may estimate a symbol timing by calculating a power of a preamble signal.

Also, according to embodiments of the present invention, a demodulator of an uplink cable modem may operate based on a symbol speed and thus may be easily configured as hardware.

The symbol timing estimation method according to the above-described exemplary embodiments of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVDs; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. An apparatus for estimating a symbol timing, comprising:
    a sampling unit to generate at least one sampled preamble signal by sampling a preamble signal with changing a phase of the preamble signal based on a symbol speed;
    a calculator to calculate a power value of each of the at least one sampled preamble signal, wherein the calculator comprises a phase path controller to classify at least one power value into at least one symbol; and
    a symbol estimator to estimate a symbol timing of a sampled preamble signal having a maximum power value by comparing each power value among the at least one sampled preamble signal, wherein the symbol estimator comprises a comparator to estimate location information associated with a symbol corresponding to a largest power value by comparing the at least one symbol.

2. The apparatus of claim 1, wherein the preamble signal corresponds to a signal received via a demodulator of an uplink cable modem.

3. The apparatus of claim 1, wherein the preamble signal corresponds to a signal that is oversampled based on the symbol speed and thereby is generated as an oversampled preamble signal.

4. The apparatus of claim 3, wherein the sampling unit generates at least one downsampled preamble signal by downsampling the oversampled preamble signal with changing a phase of a matching filter output of the oversampled preamble signal based on the symbol speed.

5. The apparatus of claim 1, wherein the preamble signal corresponds to a signal that is configured by repeatedly using at least one sequence.

6. The apparatus of claim 4, wherein the phase path controller classifies the at least one power value into at least one symbol by calculating the at least one power value based on a sampling value of each of the at least one downsampled preamble signal.

7. The apparatus of claim 1, wherein the symbol estimator further comprises:
    a switch to output, as the symbol corresponding to the largest power value, a sampling value corresponding to the largest power value among the at least one sampling value, based on the location information that is received from the comparator.

8. A method of estimating a symbol timing, the method comprising:
    using a computer-readable media including programming instructions to:
        generate at least one sampled preamble signal by sampling a preamble signal with changing a phase of the preamble signal based on a symbol speed;
        calculate a power value of each of the at least one sampled preamble signal, wherein the calculating comprises classifying at least one power value into at least one symbol; and
        estimate a symbol timing of a sampled preamble signal having a maximum power value by comparing each power value among the at least one sampled preamble signal, wherein the estimating comprises estimating location information associated with a symbol corresponding to a largest power value by comparing the at least one symbol.

9. The method of claim 8, wherein the preamble signal corresponds to a signal received via a demodulator of an uplink cable modem.

10. The method of claim 8, wherein the preamble signal corresponds to a signal that is oversampled based on the symbol speed and thereby is generated as an oversampled preamble signal.

11. The method of claim 10, wherein the generating comprises generating at least one downsampled preamble signal by downsampling the oversampled preamble signal with changing a phase of a matching filter output of the oversampled preamble signal based on the symbol speed.

12. The method of claim 8, wherein the preamble signal corresponds to a signal that is configured by repeatedly using at least one sequence.

13. The method of claim 11, wherein the classifying the at least one power value into at least one symbol comprises calculating the at least one power value based on a sampling value of each of the at least one downsampled preamble signal.

14. The method of claim 8, wherein the estimating further comprises outputting, as the symbol corresponding to the largest power value, a sampling value corresponding to the largest power value among the at least one sampling value, based on the location information that is received from the comparator.

* * * * *